Sept. 26, 1944.   R. GOLD   2,359,215
FLUID TIGHT JOINT CONSTRUCTION
Filed Oct. 25, 1940

Inventor:
RICHARD GOLD
By [signature]
his Attorney.

Patented Sept. 26, 1944

2,359,215

UNITED STATES PATENT OFFICE 2,359,215

FLUID-TIGHT JOINT CONSTRUCTION

Richard Gold, Birmingham, England

Application October 25, 1940, Serial No. 362,844
In Great Britain October 26, 1939

8 Claims. (Cl. 285—22)

The object of the present invention is to provide an improved fluid-tight joint construction adapted more particularly for use in effecting a fluid-tight connection between component parts of the casing of a submersible electric motor, but applicable to other analogous purposes.

The invention comprises the combination of tightly fitting members adapted to form between them an annular channel for accommodating the jointing material, the channel being bounded by a pair of parallel peripheral surfaces, and a pressure ring adapted to enter the said channel and fit closely between the said peripheral surfaces.

Figure 1:
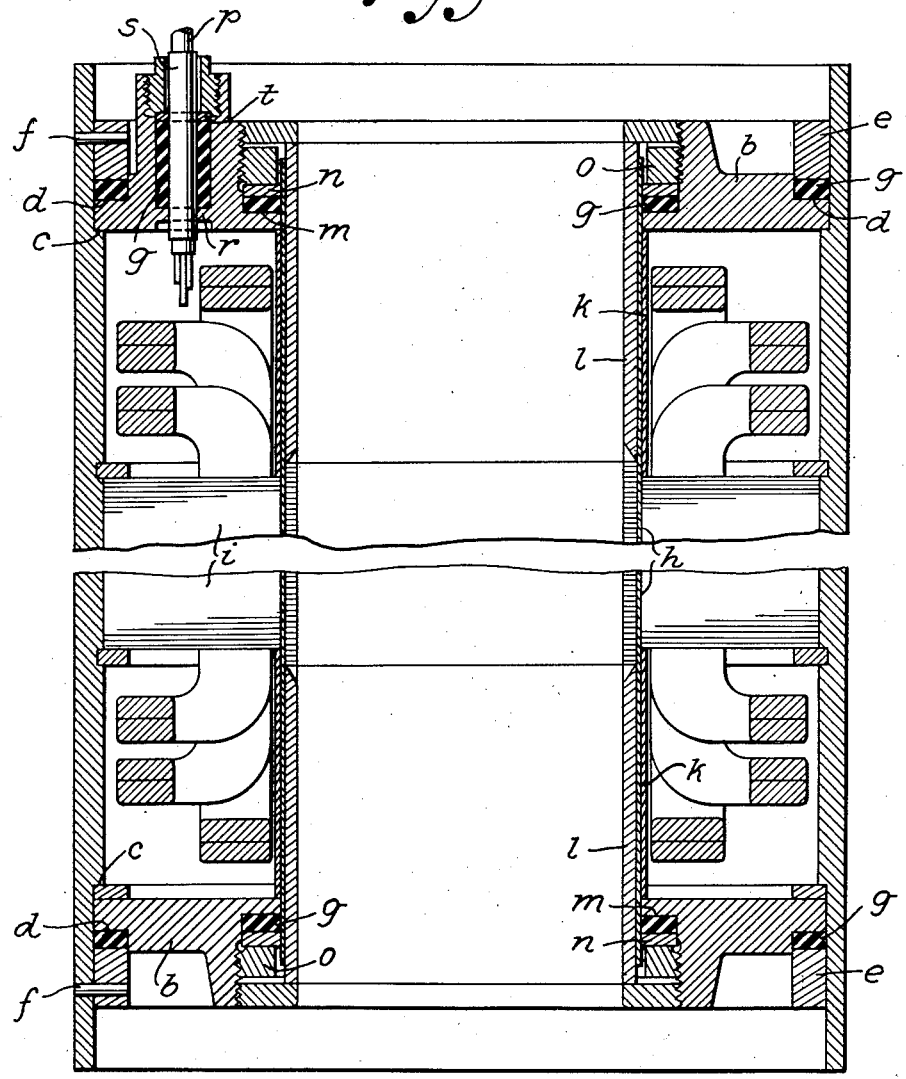
Figure 2:
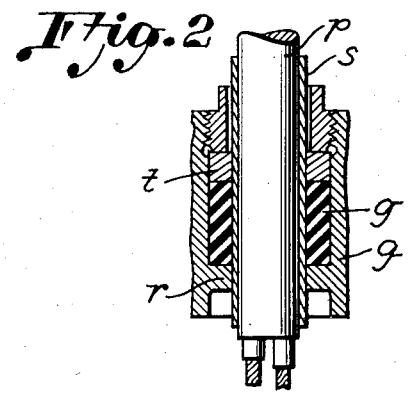
Figure 3:
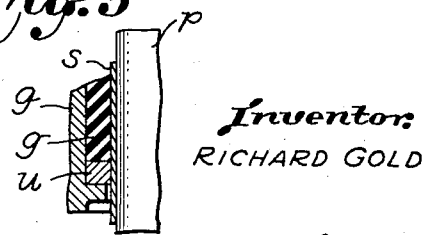

In the accompanying sheet of explanatory drawings Fig. 1 is a diagram illustrating application of the invention to the casing and end covers of a submersible electric motor. Figs. 2 and 3 are examples illustrating on a larger scale than Fig. 1 application of the invention to the gland through which a cable passes in one of the end covers of the motor. Referring to Fig. 1 each open end of the casing $a$ is adapted to receive a closely fitting annular end cover $b$, this being supported either directly or through the medium of a washer on a narorw shoulder $c$ formed on the inner wall of the casing at a convenient distance from the end. On the outer side of the cover and immediately adjacent to its outer periphery is formed a right-angled recess $d$. This recess forms with the adjacent inner surface of the casing an annular channel, the two peripheral surfaces of which are parallel with each other. Within the open end of the casing and at the outer side of the cover is arranged a pressure ring $e$. This ring is adapted to enter and close the open side of the channel and is constructed to fit closely the parallel peripheral surfaces of both the parts $a$ and $b$. The pressure ring is secured by any convenient means such as pegs $f$ inserted through the casing and ring.

Any convenient jointing material $g$ may be used in the aforesaid channel, e. g., natural or synthetic rubber, asbestos, glass wool, infusorial silica, zinc-white, or mixtures of some or all of these substances, to which may be added linseed oil. After the cover has been placed in the casing, the jointing material $g$ is placed in the channel and the pressure ring is inserted. By pressure applied to the ring the latter is caused to squeeze the jointing material into close contact with the peripheral surfaces of the channel and is then secured to the casing. When the pressure ring is in position, the jointing material completely fills and is totally enclosed by the chamber bounded by the surfaces of the channel and the inner surface of the pressure ring. As the cover fits the cylinder closely, and the ring fits the channel closely, none of the jointing material can escape from the channel under the heavy pressure imposed on it by the ring.

The application of the invention to the formation of a fluid-tight joint between one or each end cover and the adjacent end of a tubular lining arranged between the stator and rotor is essentially the same as that above described. The cover is formed with a central bore into which fits the end of the lining $h$. In the example illustrated each end portion of the lining extending beyond the stator pole piece $i$ is reinforced by a sleeve $k$ and a bush $l$. The latter after the parts have been assembled being expanded by any convenient means so as to cause the lining $h$ to fit tightly and closely the bore of the cover. At the outer side of the cover adjacent to the bore is formed a recess $m$ similar to the one at the outer periphery, the recess around the bore and the outer surface of the lining forming an annular channel as already described. Over the jointing material $g$ is placed a pressure ring $n$ which is constructed to enter the channel and fit closely the parallel peripheral surfaces and the required pressure is applied to this ring by a securing ring $o$ having a screwthread connection with the cover.

To form a fluid-tight joint around the portion of the cable $p$ which passes through one of the end covers of the motor casing I employ either of the constructions illustrated at Figs. 2 and 3. On the cover $b$ I form a hollow boss $q$ having an annular shoulder $r$ near its lower end, and on the cable I form a metal sleeve $s$ which is tightly bonded to the outer surface of the cable $p$ and which fits closely the inner periphery of the shoulder $r$. The outer surfaces of the sleeve and the inner surface of the boss form between them parallel peripheral surfaces and into the channel is inserted the jointing material $g$. Above this material is placed the pressure ring $t$ which enters the channel and closely fits its peripheral surfaces. The securing ring $o$ is externally screw-threaded and is adapted to engage the internally screw-threaded upper end of the boss $q$. By screwing down the securing ring the pressure ring is caused to compress the jointing material tightly and thereby form the required fluid-tight joint.

Instead of making the shoulder $r$ closely fit the sleeves $s$ on the cable, I may employ the modified construction shown in Fig. 3. Here the inner periphery of the shoulder *r* is made larger than the sleeve, and on it is placed a separate closure ring *u* adapted to fit closely both the sleeve *s* and the inner periphery of the boss.

By this invention an effective and durable fluid-tight joint between such component parts as those above described is obtained in a very simple and satisfactory manner.

Without further analysis the foregoing will so fully reveal the gist of my invention that others can by applying current knowledge readily adapt it for various applications without omitting features, that, from the standpoint of the prior art fairly constitute essential characteristics of the generic or specific aspects of my invention, and therefore such adaptations should and are intended to be comprehended within the meaning and range of equivalency of the following claims.

What I claim is:

1. A fluid tight joint construction comprising in combination a first tubular member having a certain outer diameter, a concentrically placed second tubular member having a certain inner diameter being greater than the outer diameter of said first tubular member, said two tubular members forming between them an annular channel bounded by a pair of parallel cylindrical channel surfaces formed by said tubular members, means permanently closing said channel at one end forming thereby a closed channel base, jointing material completely filling a certain length of said channel from said closed channel base, and a movable pressure ring entering said channel at its open end which is not closed by said permanent closing means, fitting closely between said cylindrical channel surfaces and pressing against said jointing material, thereby pressing said material simultaneously against both said cylindrical channel surfaces and said closed channel base, and causing a fluid tight joint between said tubular members parts of which these channel surfaces are.

2. A fluid tight joint construction comprising in combination a first tubular member having a certain outer diameter, a concentrically placed second tubular member having a certain inner diameter being greater than the outer diameter of said first tubular member, said two tubular members forming between them an annular channel bounded by a pair of parallel cylindrical channel surfaces formed by said tubular members, means permanently closing said channel at one end forming thereby a closed channel base, jointing material completely filling a certain length of said channel from said closed channel base, a movable pressure ring entering said channel at its open end which is not closed by said permanent closing means, and means holding said pressure ring after its insertion in said channel tightly pressed against said jointing material, said movable pressure ring fitting closely between said cylindrical channel surfaces and being pressed by said pressure means against said jointing material, thereby pressing said material simultaneously against both said cylindrical channel surfaces and said closed channel base, and causing a fluid tight joint between said tubular members parts of which these channel surfaces are.

3. A fluid tight joint construction for an electric motor comprising in combination a stationary rigid tubular casing having a certain inner diameter, a concentrically placed stationary rigid end cover having a certain outer diameter being smaller than the inner diameter of said stationary rigid tubular casing, said casing and said cover forming between them an annular channel bounded by a pair of parallel cylindrical channel surfaces formed by said casing and said end cover, means permanently closing said channel at one end forming thereby a closed channel base, jointing material completely filling a certain length of said channel from said closed channel base, a movable pressure ring entering said channel at its open end which is not closed by said permanent closing means, and means holding said pressure ring after its insertion in said channel tightly pressed against said jointing material, said movable pressure ring fitting closely between said cylindrical surfaces and being pressed by said pressure means against said jointing material, thereby pressing said material simultaneously against both said cylindrical channel surfaces and said closed channel base, and causing a fluid tight joint between said casing and said end cover parts of which these channel surfaces are.

4. A fluid tight joint construction for an electric motor comprising in combination a tubular lining having a certain outer diameter, a concentrically placed end cover surrounding said lining and having a certain inner diameter being greater than the outer diameter of said tubular lining, said lining and said end cover forming between them an annular channel bounded by a pair of parallel cylindrical channel surfaces formed by said lining and said end cover, means permanently closing said channel at one end forming thereby a closed channel base, jointing material completely filling a certain length of said channel from said closed channel base, a movable pressure ring entering said channel at its open end which is not closed by said permanent closing means, and means holding said pressure ring after its insertion in said channel tightly pressed against said jointing material, said movable pressure ring fitting closely between said cylindrical surfaces and being pressed by said pressure means against said jointing material, thereby pressing said material simultaneously against both said cylindrical channel surfaces and said closed channel base, and causing a fluid tight joint between said lining and said cover parts of which these channel surfaces are.

5. A fluid tight joint construction comprising in combination a tubular lining having a certain outer diameter, a concentrically placed tubular casing having a certain inner diameter being substantially larger than the outer diameter of said tubular casing, an annular end cover joining said lining with said casing and having an outer diameter being smaller than the inner diameter of said casing and an inner diameter being larger than the outer diameter of said lining, said annular cover thus forming annular channels both between said casing and said end cover on the one hand and said end cover and said lining on the other hand, means permanently closing each of said channels at one end forming thereby a closed channel base in each of said channels, jointing material completely filling a certain length of each said channels from the corresponding closed channel base, a movable pressure ring in each of said channels entering the corresponding channel at its open end which is not closed by permanent closing means, fitting closely between the corresponding cylindrical channel surfaces and pressing against the jointing material thereby pressing said jointing material simultaneously against both cylindrical channel surfaces and said closed channel base.

6. A fluid tight joint construction comprising in combination a first tubular member having a certain outer diameter, a concentrically placed second tubular member having a certain inner diameter being substantially larger than the outer diameter of said first tubular member, an annular connecting member joining said first tubular member with said second tubular member and having an outer diameter being at least partly smaller than the inner diameter of said second tubular member and an inner diameter being at least partly larger than the outer diameter of said first tubular member, said annular member thus forming annular channels between said first tubular member and said annular member on the one hand and said annular member and said second tubular member on the other hand, means permanently closing each of said channels at one end forming thereby a closed channel base in each of said channels, jointing material completely filling a certain length of each of said channels from the corresponding closed channel base, a movable pressure ring in each of said channels entering the corresponding channel at its open end which is not closed by permanent closing means, each of said movable pressure rings fitting closely between the corresponding cylindrical channel surfaces and pressing against the jointing material in said channel, thereby pressing this jointing material simultaneously against both corresponding cylindrical channel surfaces and said closed channel base, said channels filled with jointing material and said pressure rings entering the same thus causing fluid tight joints between said tubular members and said annular member.

7. A fluid tight joint construction for a cable at its entry to an electrical motor comprising in combination a stationary rigid tubular hollow boss having a certain inner diameter, a concentrically placed stationary rigid tubular sleeve on said cable having a certain outer diameter being smaller than the inner diameter of said hollow boss, said sleeve and said hollow boss forming between them an annular channel bounded by a pair of parallel cylindrical channel surfaces formed by said hollow boss and sleeve, means permanently closing said channel at one end forming thereby a closed channel base, jointing material completely filling a certain length of said channel from said closed channel base, a movable pressure ring entering said channel at its open end which is not closed by said permanent closing means, and means holding said pressure ring after its insertion in said channel tightly pressed against said jointing material, said movable pressure ring fitting closely between said cylindrical channel surfaces and being pressed by said pressure means against said jointing material, thereby pressing said material simultaneously against both said cylindrical channel surfaces and said closed channel base, and causing a fluid tight joint between said hollow boss and sleeve parts of which these channel surfaces are.

8. A fluid tight joint construction for a cable at its entry to an electrical motor comprising in combination a stationary rigid tubular hollow boss having a certain inner diameter, a concentrically placed stationary rigid tubular sleeve on said cable having a certain outer diameter being smaller than the inner diameter of said hollow boss, said sleeve and said hollow boss forming between them an annular channel bounded by a pair of parallel cylindrical channel surfaces formed by said hollow boss and said sleeve, a closely fitting supporting ring carried on a shoulder in said boss and permanently closing said channel at one end forming thereby a closed channel base, jointing material completely filling a certain length of said channel from said supporting ring forming said closed channel base, and a movable pressure ring entering said channel at its open end which is not closed by said supporting ring, fitting closely between said cylindrical channel surfaces and pressing against said jointing material, thereby pressing said material simultaneously against both said cylindrical channel surfaces and said closed channel base, and causing a fluid tight joint between said boss and sleeve parts of which these channel surfaces are.

RICHARD GOLD.